United States Patent
Schweigert

(10) Patent No.: US 9,461,541 B2
(45) Date of Patent: Oct. 4, 2016

(54) CONTROL METHOD FOR A POWER SUPPLY SYSTEM

(71) Applicant: Siemens Aktiengesellschaft, Munich (DE)

(72) Inventor: Harald Schweigert, Vienna (AT)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 14/389,111

(22) PCT Filed: Mar. 18, 2013

(86) PCT No.: PCT/EP2013/055520
§ 371 (c)(1),
(2) Date: Sep. 29, 2014

(87) PCT Pub. No.: WO2013/143896
PCT Pub. Date: Oct. 3, 2013

(65) Prior Publication Data
US 2015/0115916 A1    Apr. 30, 2015

(30) Foreign Application Priority Data
Mar. 30, 2012 (EP) .................................. 12162450

(51) Int. Cl.
H02M 3/158 (2006.01)

(52) U.S. Cl.
CPC ........... *H02M 3/158* (2013.01); *H02M 3/1584* (2013.01)

(58) Field of Classification Search
CPC ........................... H02M 3/158; H02M 3/1584
USPC ........................................................ 323/272
See application file for complete search history.

(56) References Cited

U.S. PATENT DOCUMENTS

| 2002/0125871 | A1 | 9/2002 | Groom et al. |
| 2004/0046535 | A1* | 3/2004 | Duffy et al. .................. 323/283 |
| 2004/0257271 | A1* | 12/2004 | Jacobson et al. ............. 342/175 |
| 2006/0273740 | A1 | 12/2006 | Saeueng et al. |
| 2011/0025292 | A1* | 2/2011 | Huang et al. .......... H02J 1/102 323/318 |
| 2012/0056479 | A1* | 3/2012 | Skinner et al. ................. 307/24 |

* cited by examiner

*Primary Examiner* — Jue Zhang
(74) *Attorney, Agent, or Firm* — Cozen O'Connor

(57) ABSTRACT

A control method for a power supply system having at least two power parts with power outputs connected in parallel, wherein each power part is actuated via a separate control and where at least one first power limit is specified for each control, where the control actuates the allocated power part up to the first power limit in a normal mode, a first drawdown value of the output voltage is specified for each control upon reaching the first power limit, and the respective control regulates the output voltage of the related power part to the first drawdown value upon reaching the first power limit so that the parallel connection of a plurality of power parts without a super-ordinate control is achieved.

16 Claims, 5 Drawing Sheets

CONTROL METHOD FOR A POWER SUPPLY SYSTEM

REFERENCE TO RELATED APPLICATIONS

This is a U.S. national stage of application No. PCT/EP2013/055520 filed 18 Mar. 2013. Priority is claimed on European Application No. 12162450.6 filed 30 Mar. 2012, the content of which is incorporated herein by reference in its entirety.

BACKGROUND OF THE INVENTION

1. Field of the Invention

The invention relates to power supplies and, more particularly, to a power supply system and control method for a power supply system having at least two power sections.

2. Description of the Related Art

In order to supply a predefined voltage to a load, use is often made of a power supply device that converts the electrical energy of a supply network into the desired voltage. This is usually a switched-mode power supply comprising a power section and a control unit. Devices comprising a plurality of power sections, these being actuated by dedicated control units in each case, are also used.

A power section comprises power components that are designed for a specific nominal load. This nominal load is usually derived from the permissible thermal loading of the component. If a connected load requires a higher power, use is made of power supply systems having power section outputs that are connected in parallel. In this way, structurally identical power sections can be used for different output powers. This simplifies the storage thereof, and allows higher unit volumes with correspondingly reduced manufacturing costs per unit.

If a plurality of power sections is connected in parallel, provision should be made for all of the power sections to participate in supplying the load, in order to ensure an even loading. This applies in particular to power supplies comprising electronic fuses that have a current limit up to which the power supply is operated in a normal mode. In the absence of a balanced load distribution when using such power supplies, one power section will switch into a safety mode before a parallel-connected power section reaches its full working capacity. This state usually results in disconnection of the power supply system, because the safety mode is only maintained for a specific time before disconnection is necessary due to possible thermal overload. Despite parallel connection of a plurality of power sections, therefore, the total nominal power is not available.

Specifically, uneven loading of parallel-connected power sections occurs as a result of varying internal resistances or varying settings of the output voltage regulators. Such variation is always unavoidable owing to component tolerances and/or control unit tolerances if each power section is actuated separately via a dedicated control unit. The power section having the highest output voltage inevitably supplies the most current to the connected load.

In accordance with the prior art, a parallel connection is realized via devices that exhibit a significant output voltage reduction when current increases due to a high resistance. In the case of a parallel connection, the currents at the outputs of the power sections inevitably balance out as a result of this voltage reduction. As soon as one power section delivers a higher power, the output voltage of this power section drops and the other power sections supply more current. This solution is associated with increased power loss due to the high resistance value of the individual power sections.

SUMMARY OF THE INVENTION

It is therefore and object of the invention to provide a power supply system and a control method for a power supply system having at least two power sections, whose power outputs are connected in parallel, where each power section has an output voltage and is actuated via a dedicated control unit, and where at least one first current limit is predefined for each control unit and the control unit actuates the associated power section in a normal mode up to said first current limit.

This and other objects and advantages are achieved in accordance with the invention by a method and an arrangement in which a first depression value of the output voltage when the first current limit is reached is predefined for each control unit, and a respective control unit regulates the output voltage of an associated power section to the first depression value when the first current limit is reached. Such a control method allows a plurality of power sections to be connected in parallel without a supervisory control unit. In addition, there is no requirement for a signal connection between the control units, merely a connection of the power outputs. Each power section is actuated separately by a dedicated control unit. During normal operation, the drop in the output voltage due to increasing current is limited to minimize losses. Only when a power section reaches the first current limit does the associated control unit initiate a voltage decrease. As a result, the output voltage of this power section falls below the output voltage of the parallel-connected power sections. The power delivered by the power section having a depressed output voltage therefore remains constant until all other parallel-connected power sections reach the first current limit. In this way, the total nominal power of all power sections is available when using a parallel connection.

Provision is advantageously made for the first depression value to be coordinated with a tolerance range of the output voltages which, in accordance with a U/I characteristic curve, the individual power sections supply when the first current limit is reached. In particular, this applies in the case of electronic fuses that work linearly, transferring the input voltage with minimal possible losses during normal operation. There is naturally variation among the individual U/I characteristic curves where there is a plurality of power sections. This is due to tolerances of the components and/or tolerances in the actuation of these components. In this case, tests or calculations can be used to determine which U/I characteristic curve can be achieved in the worst case and in the best case for power sections of identical construction. A U/I characteristic curve with a modest voltage drop due to a low internal resistance is produced by the best components within a tolerance range. The tolerance range for each component is usually specified by the manufacturer.

By virtue of knowing which U/I characteristic curve occurs in the worst case, it is already possible when developing the device to establish which maximal voltage drop can be expected as a result of increasing current. In the worst case, if by chance only components having just permissible tolerance values are installed in a single power section, this notional power section will then have maximal internal resistance. At the first current limit, all other power sections will deliver an output voltage which is higher than that of this notional power section.

Accordingly, the first depression value is established such that, when the first current limit is reached, the output voltage is depressed to that of the notional power section. Since it is not possible to have a power section that is qualitatively worse, it is thus ensured that the output voltages of all parallel-connected power sections are higher than this depressed output voltage. As part of the circuit dimensioning, an operationally reliable configuration of the power sections also takes into consideration the thermal loading and cooling when the least favorable component tolerances and maximal permissible loading are present, such that overheating is not possible under any circumstances. The voltage depression to this value is therefore thermally permissible without having to invest additional resources into the cooling.

In an embodiment of the invention, a second current limit is predefined for each control unit, said second current limit being higher than the first current limit, for a second depression value for the output voltage when the second current limit is reached to be predefined for the respective control unit, and for the respective control unit to regulate the output voltage of the associated power section to the second depression value when the second current limit is reached. A two-stage current distribution architecture is thus realized.

This two-stage current distribution architecture is advantageously configured such that at least one power section is operated in an overload mode if every other power section is regulated to the first depression value. Therefore, as soon as all parallel-connected power sections are operated at the first current limit, and consequently deliver the maximal nominal power, a further power increase occurs. At least one power section goes into an overload mode with a current that is higher than the first current limit. A time limit is preferably predefined for this overload operation, in order to avoid overloading of the power section concerned. The first power section to go into the overload mode is advantageously that which was previously first to reach the first current limit as a result of an increasing load.

Likewise, provision is advantageously made for the second depression value to be coordinated with a tolerance range of the output voltages or a differential voltage which, in accordance with a U/I characteristic curve, the individual power sections supply when the second current limit is reached. A notional power section whose components are all only just in the tolerance range is again considered in this case. The output voltage of this notional power section at the second current limit establishes the second depression value.

It is advantageous for at least one power section to be operated in a limiting mode if every other power section is regulated to the second depression value. The second current limit value therefore defines a limit which, if exceeded, causes the current to be limited and if applicable disconnected. Disconnection always occurs if the loading of the power supply system is so great that all power sections briefly exceed this second current limit value. A disconnection only occurs before this if a power section exceeds the permissible duration of the overload operation when the second current limit has been reached. In this way, all parallel-connected power sections can briefly be operated in the overload mode. The first power section to go into the limiting mode is advantageously that which was previously first to reach the second current limit as a result of an increasing load.

In accordance with an embodiment of the control method, a voltage difference is predefined as a respective depression value. As soon as a power section reaches a first or second current limit, the associated control unit decreases the output voltage by a predefined voltage difference, which also represents the regulating variable subsequently. In particular, a depression value that is predefined as a voltage difference is advantageous in the case of electronic fuses that are linearly controlled and have a shared voltage source.

Alternatively, provision is made for an output voltage value to be predefined as a respective depression value. In this case, the control unit regulates a power section to a predefined voltage value as soon as a first or second current limit is reached. Such a method is advantageous in the case of switched-mode power sections, which are continuously regulated to a predefined output voltage.

Furthermore, it is advantageous for each power section to deliver an output voltage that drops as output current increases in each case. Such a U/I characteristic curve allows the respective output current or the respective output voltage to be captured easily in normal operation. If the respective U/I characteristic curve is stored in a capture unit, the measurement of one output value (current or voltage) is sufficient. If the power sections are arranged as parallel-connected power protection switches at the output of a power supply, such a U/I characteristic curve is produced automatically. In the case of parallel-connected switched-mode power supplies, a declining U/I characteristic curve can be realized by adapting the respective actuation (artificial internal resistance).

Alternatively, provision is made for each power section to deliver an output voltage that is so regulated as to be constant. Therefore, the output voltage does not change in the respective operating mode. Only if a first or second current limit is exceeded does a voltage depression occur, the voltage being held constant at this depressed level as the current continues to increase.

A power supply system in accordance with the invention comprises at least two power sections, whose power outputs are connected in parallel, where each power section is actuated via a dedicated control unit and where each control unit is so configured as to perform the above-cited method.

In an embodiment, the power supply system comprises one power supply device having a plurality of outputs that are connected in parallel via a connection.

Power supply devices comprising a plurality of electronically protected outputs can therefore be used in a simple manner for parallel operation, without the electronic fuses resulting in a disconnection of the device. The purpose of a parallel connection is to supply a large load, for which the power of one output is not sufficient.

In accordance with a further embodiment, the power supply system comprises a plurality of power supply devices, whose outputs are connected in parallel via a connection. Consequently, such power supply devices do not require a supervisory control unit when operating in parallel in order to supply a load.

In this case, each power supply device advantageously comprises a voltage regulator in order to regulate the respective output voltage to a constant value.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below by way of example with reference to the appended figures, in which.

DETAILED DESCRIPTION OF THE PREFERRED EMBODIMENTS

Figure 1A:
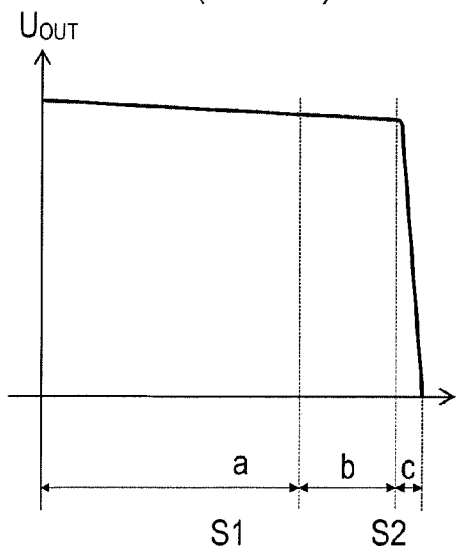
FIG. 1a schematically shows a graphical plot of a U/I characteristic curve of a conventional power section with an electronic fuse.

The U/I characteristic curve illustrated in FIG. 1a depicts the profile of an output voltage $U_{OUT}$ over an output current $I_{OUT}$ of a protected power supply. In a first region a of the output current $I_{OUT}$, the power supply is operated in a normal mode. In this mode, power can be delivered to a load continuously. If a first current limit S1 is exceeded, the device goes into an overload region b. For example, a timer starts running in this case. If a permissible duration is reached in this overload mode, the power supply disconnects.

If the current $I_{OUT}$ suddenly increases further, without the permissible duration in the overload mode being reached, the device goes into a limiting mode region c when a second current limit S2 is reached. Here, disconnection occurs after a very short time period (e.g., 100 ms), because a linear limiting element absorbs the excess energy. The duration in the limiting mode depends primarily on the thermal loading capacity of the limiting element.

Figure 1B:
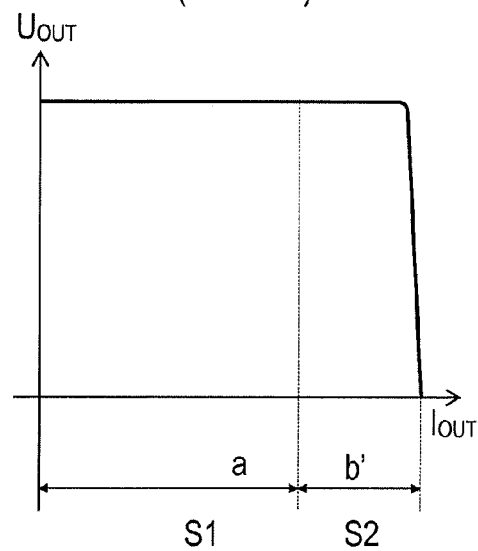
FIG. 1b schematically shows a graphical plot of a U/I characteristic curve of a conventional switched-mode power section.

A switched-mode power section usually supplies a constant output voltage $U_{OUT}$ as illustrated in FIG. 1b. No additional energy loss is absorbed in an overload region b' in this case. Disconnection after a predefined time is nonetheless advisable because a prolonged overload indicates a fault in a supplied load.

Figure 2:
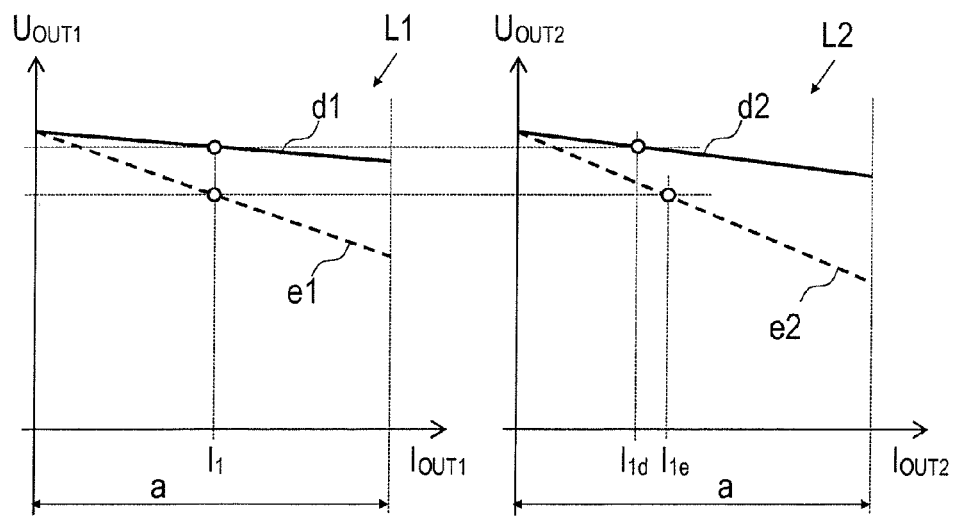
FIG. 2 schematically shows graphical plots of U/I characteristic curves of two conventional parallel-connected power sections.

If two power sections L1, L2 of a power supply system are connected together, output currents $I_{OUT1}$, $I_{OUT2}$ occur as per FIG. 2. Those components that are connected in parallel in the power supply system are designated as power section L1, L2 or L1', L2'. These include, e.g., power protection switches (e.g., linear regulators) functioning as electronic fuses of a power supply device, or parallel-connected converters having in each case an artificially regulated internal resistance that produces a declining characteristic curve.

Even in the case of structurally identical embodiments of the parallel-connected components, the characteristic curves d1, d2 and e1, e2 respectively differ from each other due to unavoidable tolerances. In this case, the gradient of the U/I characteristic curves d1, d2 and e1, e2 influences the distribution of the currents $I_{OUT1}$, $I_{OUT2}$. In the case of flat U/I characteristic curves d1, d2, the same voltage at the first output results in a current $I_{OUT1}$ of approximately 50% of the nominal current. However, the current $I_{1d}$ is only 30% of the nominal current at the second output.

The two currents $I_{OUT1}$, $I_{OUT2}$ are closer if the U/I characteristic curves e1, e2 are steeper. In the example illustrated, the current $I_{1e}$ of the second output is already 40% of the nominal voltage when the first output carries 50% of the nominal current.

Figure 3:
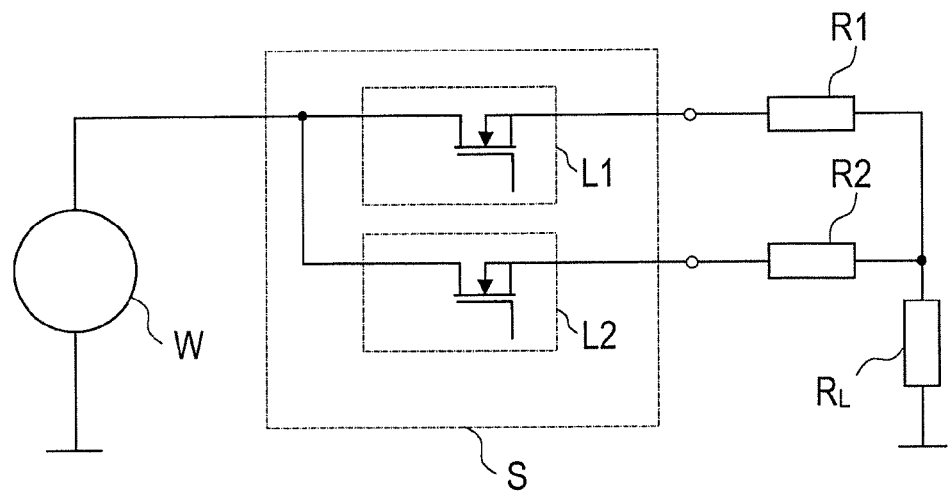
FIG. 3 schematically shows a conventional power supply device with two parallel-connected outputs and output resistors.

One known way to realize a steeper U/I characteristic curve e1, e2 is the arrangement of resistors R1, R2 at the two outputs as illustrated in FIG. 3. A converter W comprises two outputs in this case, each output being protected by a power section L1, L2 in the form of an in-phase regulator. These two power sections L1, L2 are combined in a fuse module S, for example. The actuation of the in-phase regulators occurs separately as a function of the current $I_{OUT1}$, $I_{OUT2}$ flowing through an output channel in each case. A dedicated resistor R1, R2 is provided at each output, in order to increase the gradient of the U/I characteristic curves. Downstream of the resistors R1, R2, the outputs are combined together and connected to a load $R_L$.

In the case of identical nominal currents, provision is usually made for the resistors R1, R2 to have identical values here. It is disadvantageous that significant power losses are incurred in the resistors R1, R2 in order to ensure the desired current balance.

Figure 4:
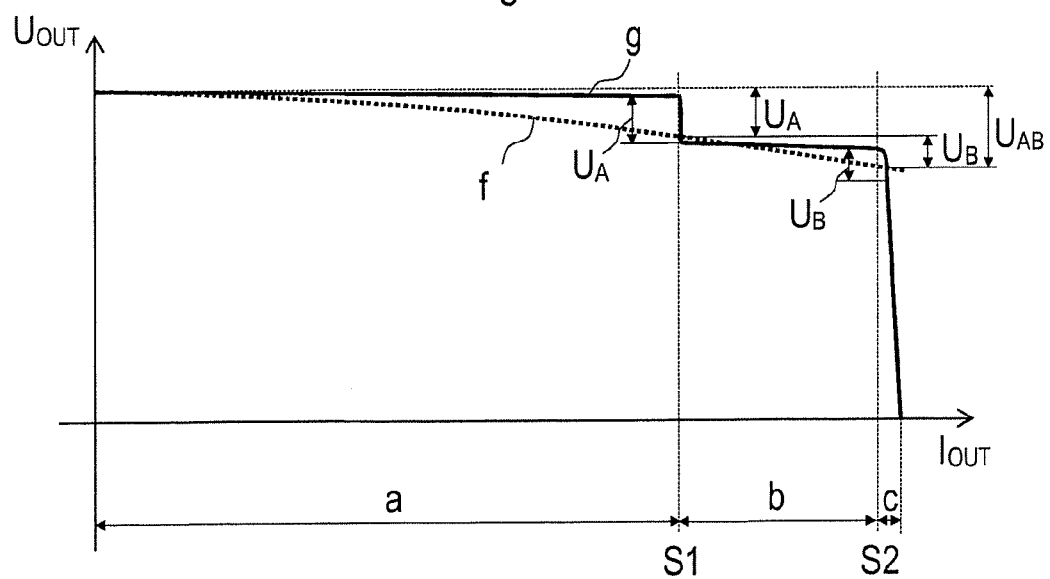
FIG. 4 schematically shows a graphical plot of a U/I characteristic curve with depression of the output voltage at a first and a second current limit in accordance with the invention.

This disadvantage is avoided by the present invention. An example of a corresponding U/I characteristic curve is illustrated in FIG. 4. A first current limit S1 is predefined at a transition point from a normal mode region a to an overload region b. A second current limit S2 is located at the end of the overload mode region b. A limiting mode region c starts at that point.

A notional power section that consisted solely of components having properties that are only just within tolerance would exhibit the dotted-marked U/I characteristic curve f. Such a notional power section would emit maximal permissible heat loss during operation. Every power section is configured for this. Such an U/I characteristic curve f can be either calculated or measured via a specially prepared power section which satisfies the above conditions.

The output voltage values of this notional or specially prepared power section, with values being produced at the current limits S1, S2, predefine the depression values $U_A$, $U_B$, $U_{AB}$ and $U_A'$, $U_B'$ that provide an optimally effective solution for all power sections used. A solution in accordance with the invention is however also provided if, when a current limit S1, S2 is reached, the voltage is not depressed quite as far as the respective output voltage value of the notional power section (dotted line). All parallel-connected power sections can then be used up to this depression value.

A parallel-connected power section L1, L2 or L1', L2' in a power supply system exhibits a U/I characteristic curve g, whose incline will usually be significantly less than the characteristic curve f of the qualitatively worst power section. Therefore, only slight losses occur in the normal mode region a. Only when the first current limit S1 is reached does the associated control unit STR1 or STR2 regulate the output voltage to the predefined depression value.

In the present example, when the first current limit S1 is reached, the output voltage is depressed by a voltage value $U_A$, which corresponds to the voltage drop of the notional power section having the poor U/I characteristic curve f. When the second current limit S2 is reached, an associated control unit STR1 or STR2 depresses the output voltage by a further voltage value $U_B$. The sum $U_{AB}$ of the two depression values $U_A$ and $U_B$ corresponds in this case to the voltage drop of the notional power section at the second current limit S2. In this way, it is ensured that the output voltage $U_{OUT}$ of the corresponding power section is sufficiently depressed at each current limit S1, S2. The output voltages of the other parallel-connected power sections, which have not yet reached the current limit S1 or S2, are then higher than the depressed output voltage in each case. These power sections therefore contribute an equally high portion of the total current.

Figure 5:
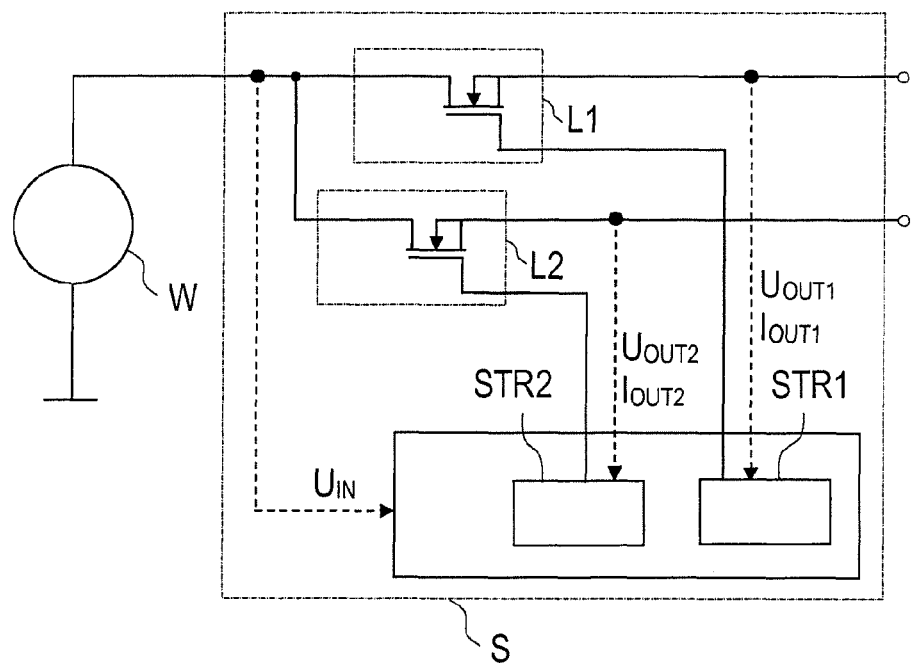
FIG. 5 schematically shows a power supply device with two parallel-connected outputs which are actuated in accordance with the invention.

A schematic circuit arrangement is illustrated in FIG. 5. Two outputs are connected to a shared converter W via two power sections L1, L2 in the form of in-phase regulators. Here, each power section L1, L2 is actuated independently by a dedicated control unit STR1, STR2. Together with the control units STR1, STR2, the two power sections L1, L2 form an electronic fuse module S with two output channels. In this case, the control units STR1, STR2 are supplied with shared variables such as the input voltage $U_{IN}$, and with the output variables $U_{OUT1}$, $I_{OUT1}$ and $U_{OUT2}$, $I_{OUT2}$ for each channel respectively.

The current monitoring and current limiting functions are performed by the parallel-connected power sections L1, L2 and the control units STR1, STR2 in this example. As soon as a current $I_{OUT1}$ or $I_{OUT2}$ of a respective power section L1 or L2 exceeds the first current limit S1, a timer starts to run. The respective power section L1 or L2 is then in the overload mode. In this mode, more current (e.g., 130% to 200% of the nominal current) can be supplied for a predefined time period (e.g., 5 seconds). The power section L1 or L2 disconnects after expiry of the time period.

The present disclosed embodiments of the invention have the advantage that the activation of the timer does not already occur when the first current limit S1 is reached. For example, if the current $I_{OUT1}$ of the first power section L1 initially reaches the first current limit S1 as a result of a low internal resistance (higher output voltage $U_{OUT1}$), only the output voltage $U_{OUT1}$ is initially depressed as described above. This is achieved by increasing the forward voltage. Each power section is thermally designed for this, because in the least favorable case this increased forward voltage occurs at the upper tolerance limit as a result of an internal resistance. The timer does not yet run at this time point because the overload mode has not yet been entered. Instead, the second power section L2 supplies more current $I_{OUT2}$ to the parallel-connected output, because its output voltage $U_{OUT2}$ is now higher than the depressed output voltage $U_{OUT1}$. In this case, if the current $I_{OUT2}$ of the second power section L2 likewise reaches the first current limit S1, its output voltage $U_{OUT2}$ is also depressed. As the load increases, a point is therefore reached at which both power sections L1, L2 deliver the same current S1.

If the power required by a load continues to increase after this time point, the first power section L1 goes into the overload mode and supplies a higher current $I_{OUT1}$ while applying the predefined time limit. As an alternative to the time limit, thermal monitoring is also possible. In this case, the relevant power section L1 only disconnects in the overload mode if the thermal loading capacity of a critical component is reached. As the load continues to increase, the better, first power section L1 is therefore held at the depressed voltage via voltage regulators even though the power section L1 has a lower internal resistance. The output voltage $U_{OUT1}$ of the better power section L1 remains depressed as the current increases, and the first power section L1 takes responsibility for all of the additional current. It is therefore in the overload mode. Only when the internal resistance of the first power section L1 necessitates a slight reduction in the output voltage $U_{OUT1}$, is the second, worse power section L2 loaded beyond the first current limit S1 and starts its timer.

If the current $I_{OUT1}$ of the first power section L1 subsequently reaches the second current limit 2 within the time limit in the overload mode, a voltage depression, again occurs. The depressed voltage $U_{OUT1}$ is then lower than the momentary voltage $U_{OUT2}$ of the second power section L2. Here, the current $I_{OUT2}$ of the second power section L2 increases until the second current limit S2 is also reached.

If all power sections L1, L2 reach the second current limit S2, then the power supply system delivers the maximal possible power with the sum of the maximal permissible currents (e.g., two times 130% of the respective nominal current).

With increasing power demand, the power section L1 having the lower internal resistance exceeds the second current limit S2 and goes into a limiting mode. This limiting mode must only be maintained briefly, because overheating of the relevant power section L1 will otherwise occur. Therefore, the power section L1 disconnects after a short time period (e.g., 100 ms) in the limiting mode. However, if the current $I_{OUT1}$ falls back below the second current limit S2 before expiry of this short time period, disconnection only occurs if the predefined time limit in the overload mode has expired. Here likewise, disconnection does not occur if the current $I_{OUT1}$ falls below the first current limit S1 beforehand. In particular, brief current peaks occur if capacitors have to be charged when a load is switched on. The contemplated embodiment of the present invention provide a power supply system which delivers very high charging currents for this case, without causing a power section L1 or L2 to be disconnected. All parallel-connected power sections L1, L2 are used at all times up to the respective current limit S1, S2.

Figure 6:
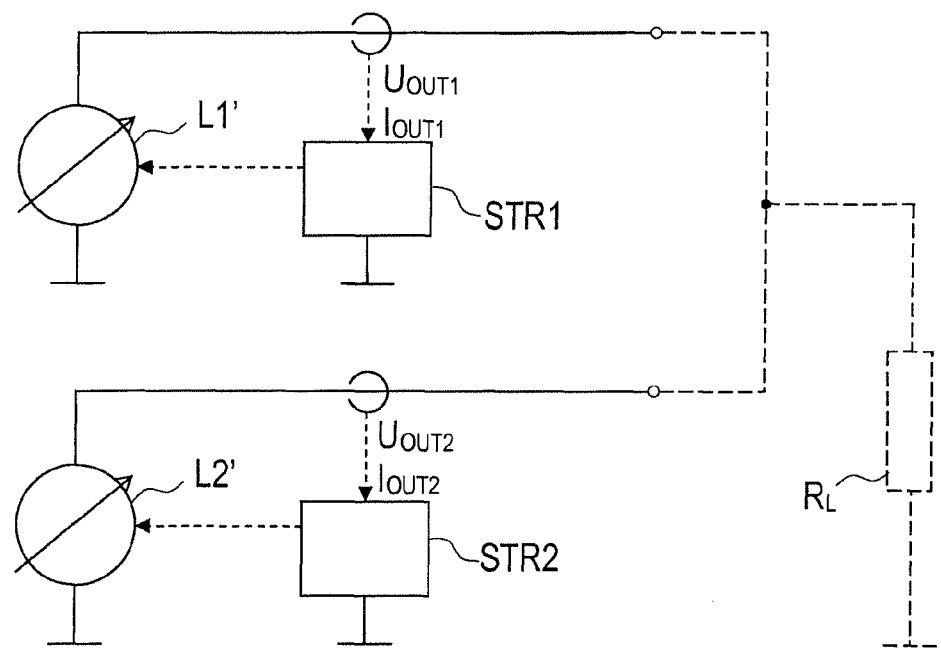
FIG. 6 schematically shows two parallel-connected power supply devices which are actuated in accordance with the invention.

An alternative embodiment comprising two power sections L1', L2' in the form of converters is illustrated in FIG. 6. Each power section L1', L2' is actuated by a dedicated control unit STR1, STR2. The tolerances during the actuation result in varying U/I characteristic curves in this case, such that one power section L1' or L2' always delivers more current $I_{OUT1}$ or $I_{OUT2}$ respectively to a connected load $R_L$. Two current limits S1, S2 are also predefined in this case. If the first current limit S1 is exceeded, an overload mode starts in which the relevant power section L1' or L2' delivers a higher current (e.g. 150% of the nominal current) at the respective output. After reaching a predefined time period in the overload operation, or if the second current limit S2 is exceeded, the power section L1' or L2' disconnects.

If a current limit S1, S2 is reached, the above described voltage depression occurs first to bring all parallel-connected power sections L1', L2' down to the respective current limit S1, S2. In this way, the full working capacity of all parallel-connected power sections L1', L2' is used at all times to supply a connected load $R_L$.

Figure 7:
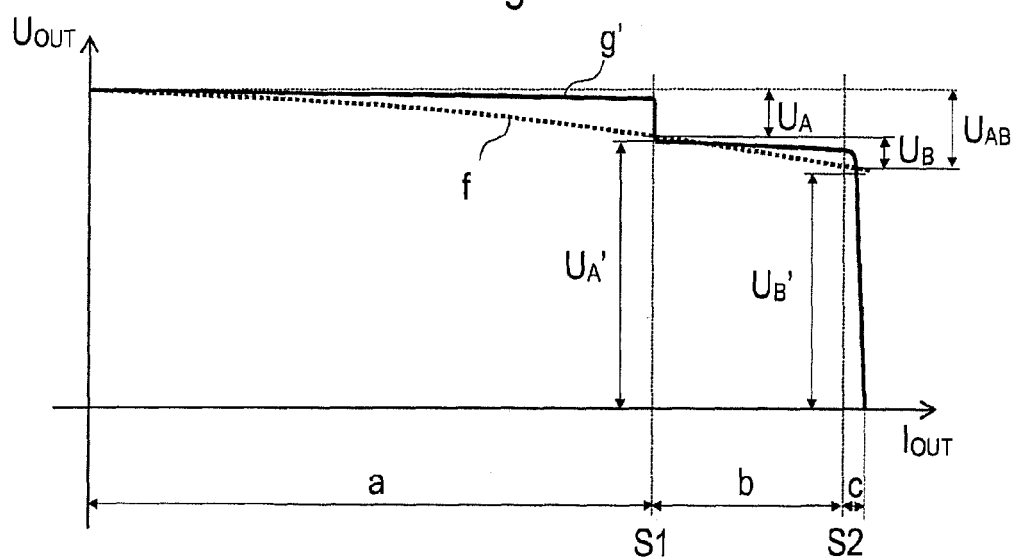
FIG. 7 schematically shows a graphical plot of a U/I characteristic curve with depression of the output voltage to predefined voltage values at a first and a second current limit in accordance with the invention.

Like FIG. 4, FIG. 7 shows a U/I characteristic curve with a voltage depression at the first and second current limit S1, S2. In this case, a depression value $U_A'$ $U_B'$ corresponding to an absolute output voltage $U_{OUT}$ is predefined for each control unit STR1, STR2. These depression values $U_A'$ $U_B'$ are selected such that they are each lower than an output voltage $U_{OUT}$ of a notional power section having the worst possible U/I characteristic curve f. The values are therefore coordinated with the voltage drops $U_A$, $U_B$ or $U_{AB}$ of such a notional power section.

Such a predefinition of depression values $U_A'$ $U_B'$ is intended for the parallel connection of power sections L1', L2' in the form of converters. However, such voltage depression is also suitable for power sections L1, L2 in the form of power protection switches.

Predefining the respective depression value $U_A'$ $U_B'$ as an absolute output voltage $U_{OUT}$ is always advantageous if the respective power section L1', L2' is regulated to a constant output voltage $U_{OUT}$ in the normal mode. By virtue of a sufficiently high input voltage, each voltage regulator is capable of balancing out the internal resistance of the associated power section L1', L2' in this case. This applies to both linear voltage regulators and switched-mode power sections.

For example, at a power section L1', L2' with an in-phase regulator, a higher resistance than the internal resistance of the power section L1', L2' drops. The respective depression value $U_A'$ $U_B'$ is not then adapted to the internal resistance of the power section, but to the tolerances of the voltage setting and the possibly different cable lengths and cross sections of those connection elements by means of which the two power sections L1', L2' are connected to the shared output voltage. The majority of the tolerance in this case is attributable to the voltage setting, and to the thermal and aging-related drift of the voltage control.

Figure 8:
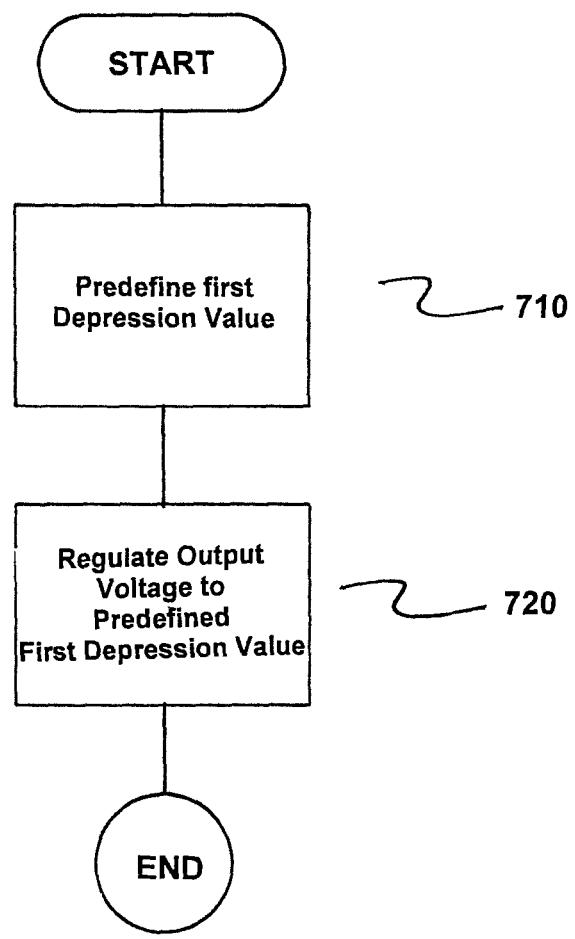
FIG. 8 is a flowchart of the method in accordance with the invention.

FIG. 8 is a flowchart of a control method for a power supply system having at least two power sections (L1, L2, L1', L2') with power outputs connected in parallel, where each power section (L1, L2, L1', L2') has an output voltage ($U_{OUT}$, $U_{OUT1}$, $U_{OUT2}$) and is actuated via a dedicated control unit (STR1, STR2) and at least one first current limit (S1) is predefined for each control unit (STR1, STR2), and where the control unit (STR1, STR2) actuates an associated power section (L1, L2, L1', L2') in a normal mode up to the first current limit (S1).

The method comprises predefining a first depression value ($U_A$, $U_A'$) of the output voltage ($U_{OUT}$, $U_{OUT1}$, $U_{OUT2}$) when the first current limit (S1) is reached for each control unit (STR1, STR2), as indicated in step 710. Next, the output voltage ($U_{OUT}$, $U_{OUT1}$, $U_{OUT2}$) of the associated power section (L1, L2, L1', L2') is regulated by a respective control unit (STR1, STR2) to the predefined first depression value ($U_A$, $U_A'$) when the first current limit (S1) is reached, as indicated in step 720.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A control method for a power supply system having at least two power sections with power outputs connected in parallel, each power section having an output voltage and being actuated via a dedicated control unit and at least one first current limit being predefined for each control unit, the control unit actuating an associated power section in a normal mode up to said first current limit, the method comprising:
    predefining a first depression value of the output voltage to a transition point from a normal mode region to an overload region at which the first current limit is reached for each control unit;
    regulating, by a respective control unit, the output voltage of the associated power section to the predefined first depression value to the transition point from the normal mode region to the overload region at which the first current limit is reached; and
    starting a timer for a predetermined time limit when a current level of a power section of the at least two power sections exceeds the first current limit.

2. The control method as claimed in claim 1, wherein the first depression value is coordinated with a tolerance range of the output voltages delivered by the individual power sections of the at least two power sections in accordance with a U/I characteristic curve when the first current limit is reached such that, when the first current limit is reached, the output voltage of a relevant power section of the at least two power sections is depressed to that value which a power section having the least favorable tolerance values delivers at said first current limit.

3. The control method as claimed in claim 1, further comprising:
    predefining a second current limit for each dedicated control unit, said second current limit being higher than the first current limit;
    predefining a second depression value for the output voltage when the second current limit is reached for the respective control unit; and
    regulating, by the respective control unit, the output voltage of the associated power section of the at least two power sections to the second depression value when said second current limit is reached.

4. The control method as claimed in claim 2, further comprising:
    predefining a second current limit for each dedicated control unit, said second current limit being higher than the first current limit;
    predefining a second depression value for the output voltage when the second current limit is reached for the respective control unit; and
    regulating, by the respective control unit, the output voltage of the associated power section of the at least two power sections to the second depression value when said second current limit is reached.

5. The control method as claimed in claim 1, wherein at least one power section is operated in an overload mode if every other power section is regulated to the first depression value.

6. The control method as claimed in claim 3, wherein the second depression value is coordinated with a tolerance range of output voltages delivered by individual power sections of the at least two power sections in accordance with a U/I characteristic curve when the second current limit is reached such that, when the first current limit is reached, the output voltage of the relevant power section is depressed to that value which a power section having least favorable tolerance values would deliver at said first current limit.

7. The control method as claimed in claim 4, wherein the second depression value is coordinated with a tolerance range of output voltages delivered by individual power sections of the at least two power sections in accordance with a U/I characteristic curve when the second current limit is reached such that, when the first current limit is reached, the output voltage of the relevant power section is depressed to that value which a power section having least favorable tolerance values would deliver at said first current limit.

8. The control method as claimed in claim 3, wherein at least one power section is operated in a limiting mode if every other power section is regulated to the second depression value.

9. The control method as claimed in claim 1, wherein a voltage difference is predefined as a respective depression value.

10. The control method as claimed in claim 1, wherein an output voltage value is predefined as a respective depression value.

11. The control method as claimed in claim 1, wherein each power section delivers an output voltage which drops as each output current increases.

12. The control method as claimed in one of the claim 1, wherein each power section delivers an output voltage which is so regulated as to be constant.

13. A power supply system having at least two power sections with power outputs connected in parallel, wherein each power section is actuated via a dedicated control unit,
wherein each control unit is configured to:
predefine a first depression value of an output voltage to a transition point from a normal mode region to an overload region at which the first current limit is reached for each control unit;
regulate, by a respective dedicated control unit, the output voltage of the associated power section to the predefined first depression value to the transition point from the normal mode region to the overload region at which the first current limit is reached; and
start a timer for a predetermined time limit when a current level of a power section of the at least two power sections exceeds the first current limit.

14. The power supply system as claimed in claim 13, wherein the power supply system comprises one power supply device having a plurality of outputs which are connected in parallel via a connection.

15. The power supply system as claimed in claim 13, wherein the power supply system comprises a plurality of power supply devices with outputs connected in parallel via a connection.

16. The power supply system as claimed in claim 15, wherein each power supply device includes a voltage regulator to regulate a respective output voltage to a constant value.

* * * * *